United States Patent [19]
Laumeyer et al.

[11] Patent Number: 5,572,632
[45] Date of Patent: Nov. 5, 1996

[54] UNIVERSAL FRAME BUFFER FOR A RENDERING DEVICE

[75] Inventors: Robert A. Laumeyer, Minneapolis; Christopher J. Laurel, Watertown, both of Minn.

[73] Assignee: Laser Master Corporation, Eden Prairie, Minn.

[21] Appl. No.: 319,491

[22] Filed: Oct. 7, 1994

[51] Int. Cl.$^6$ ................................................ G06K 15/00
[52] U.S. Cl. ........................ 395/116; 395/102; 395/109
[58] Field of Search .................................. 395/102, 109, 395/112, 115, 116, 164, 165, 166, 131; 358/444, 404, 451, 528, 523, 524; 345/150, 153, 154, 199, 185–186, 187

[56] References Cited

U.S. PATENT DOCUMENTS

| | | | |
|---|---|---|---|
| 4,500,919 | 2/1985 | Schreiber | 358/518 |
| 4,670,780 | 6/1987 | McManus et al. | 358/518 |
| 4,731,662 | 3/1988 | Udagawa et al. | 358/520 |
| 4,843,379 | 6/1989 | Stansfield | 345/154 |
| 4,941,038 | 7/1990 | Walowit | 358/518 |
| 5,168,298 | 12/1992 | Kadowaki | 395/109 |
| 5,185,661 | 2/1993 | Ng | 358/515 |
| 5,243,414 | 9/1993 | Dalrymple et al. | 358/500 |
| 5,257,097 | 10/1993 | Pineau et al. | 358/500 |
| 5,268,754 | 12/1993 | Van de Capelle et al. | 358/527 |
| 5,278,678 | 1/1994 | Harrington | 358/518 |
| 5,282,046 | 1/1994 | Yamaguchi | 358/518 |
| 5,296,923 | 3/1994 | Hung | 358/527 |
| 5,299,291 | 3/1994 | Ruetz | 395/109 |
| 5,305,119 | 4/1994 | Rolleston et al. | 358/523 |
| 5,309,257 | 5/1994 | Bonino et al. | 358/504 |
| 5,313,291 | 5/1994 | Appel et al. | 358/501 |
| 5,315,415 | 5/1994 | Kawai et al. | 358/515 |
| 5,319,473 | 6/1994 | Harrington | 358/501 |
| 5,321,797 | 6/1994 | Morton | 395/131 |
| 5,323,249 | 6/1994 | Liang | 358/518 |
| 5,331,440 | 7/1994 | Kita et al. | 358/529 |
| 5,488,690 | 1/1996 | Cho | 395/116 |

OTHER PUBLICATIONS

"Color Encoding Standard," *Xerox System Integration Standard*, Jul. 1991.

*Primary Examiner*—Arthur G. Evans
*Attorney, Agent, or Firm*—Kinney & Lange, P.A.

[57] ABSTRACT

Image data processing using a transformation thereof to device independent, intermediate color space color coordinates while avoiding gamut matching determinations during and in subsequently completing transformation of coordinates to being suited to an output device, and storing such coordinates in an intermediate frame buffer.

13 Claims, 2 Drawing Sheets

UNIVERSAL FRAME BUFFER FOR A RENDERING DEVICE

BACKGROUND OF THE INVENTION

The present invention relates to preferred image reproduction and, more particularly, to the reproduction of colored images generated by one of alternative input sources through the use of one of alternative output reproduction devices.

The increasing demand for communication of information has led to substantial increases in the generation of textual and graphical information. This information is typically reproduced in hardcopy form for distribution to those intended to receive such information. The distributor of this information is usually very desirous of having the distributed hardcopy form of the information appear as closely as possible to the originally generated form of the information.

Such a result is especially difficult to achieve when the distribution medium is printed hardcopy containing colored graphics or text, the source of which may be original generation in a computer graphic system or through scanning at least in part previously printed information often followed by editing same in a computer graphic system. The information describing such colored graphics or text generated by a computer graphics system or by a scanner, or both, must be communicated as an input image from such an input device used for such generating to the output device that is to form the corresponding printed hardcopy such as a color printer which may be a color laser copier or a ink jet printer, for example. Usually this input image information also must be communicated within the computer graphics system to some display device so that the operator may assess the results of various actions in the generation of that image.

There are great differences between the display typically used in input devices and the form of the output from typically used output devices, and there are often substantial differences between the perceptions of disinterested observers of seemingly identical colored images and text. Not surprisingly, what constitutes a sufficient match between output hardcopy and input displays of generated colored graphics and text is quite subjective and, furthermore, what is sufficient may change with the intended use of the printed hardcopy output. Thus, this communication process of input device generated textual and graphics information has many complex variables involved, resulting in substantial difficulty in communicating information accurately as well as in numerous opportunities for error.

Commonly, the generated input textual and graphical information is generated, or at least approved, through use of a video monitor as the input generating device display. Such a monitor, based on a cathode ray tube, provides a display based on an electron beam forming a raster pattern over an array of tiny triads of red, blue and green emitting phosphors such that each of those triads forms one pixel of the displayed image. Varying the intensity of an electron beam impinging on such a phosphor varies the color of the light emitted therefrom, and the light emitted from each combines additively to form the effective hue and luminance of that pixel. As a result, digital-to-analog control (DAC) signals controlling the electron beam which electively impinges on each phosphor in each triad can be viewed as coordinates of a color space forming the RGB color system with red, green and blue as the primary colors. Any point in that space will have three coordinate values locating same which thus define the hue and luminance of the color represented thereby on the video monitor.

A color printer as a typical output device also operates by forming a raster pattern, but in this instance the raster pattern is formed by a laser beam in electrophotographic printing devices, or by a printhead in ink jet or thermal resistance printing devices, or the like. The laser beam or the printhead controls the deposition of toner or priming ink at each of many positions along a print line, and forms a pixel in the output image by causing toner or ink to be deposited at the location therefor of at least one, and typically of each of three colors: cyan, magenta and yellow. Quite often, a fourth color of toner or ink is also deposited, that color being black.

Thus, the signals controlling the deposition densities of such toners or inks as colorants, the fractions of full densities of such colorants, can be viewed as coordinates of a three coordinate color space with each of the three coordinates representing one of the colors cyan, magenta and yellow to form the CMY color system. Quite often the color space is expanded to be 4-dimensional, with the fourth coordinate representing black to form the CMYK process color system. Such ink or toner colorants act as light filters that subtract light of certain wavelengths while reflecting other wavelengths so that the light reflected from a pixel of such colorants represents the light transmitted after such wavelength subtraction, i.e. the inks combine subtractively.

Although care must be used in characterizing the performance of a video monitor insofar as providing expected luminance and hues of colors of the pixels displayed thereby for given R, G and B signal values, luminance and hues displayed by pixels in such a monitor for specified values of R, G and B are much more predictable than are the pixel colors resulting from specifying signals for the fractions of maximum printed densities of cyan, magenta, yellow and black toners or inks to be printed. Such difficulty in predicting the results of the printing of selected fractional densities of these colorants arise for many reasons including the nonlinear relationship between the saturation of a printed colorant and the density of that colorant printed (proportionality failure), the unpredictable coloring results of combining different densities of the primary colorants (additivity failure), the varying behavior of the media printed upon, etc. Beyond these shortcomings in the toners or inks and the media, there is considerable variation between output printing devices even of the same kind insofar as the density of toner or ink printed for a particular signal value supplied thereto directing that printing may vary. In addition, the color of the media, it's opacity, its receptivity to toners or inks can strongly effect the perceived nature of the output.

A further complicating factor is that there is nearly always a substantial mismatch between the colors that a color printer as an output device is capable of reproducing, and the colors which can be specified and displayed on a video monitor as an input device. That is, the range of colors that can be specified and displayed on the video monitor of the input device on which an original generated image is formed (i.e., the color gamut of the input device video monitor) will not match the range of colors that form the color gamut of printable colors by the output device. In these circumstances, the proper communication of color graphical and textual information to the output device, of a page representation for which an input image has been generated in the input image forming graphics system, involves a complicated transform.

The R, G and B color coordinates of the RGB color space values, specified for each pixel on the input device video monitor display image, must be transformed to corresponding coordinates in the CMY color space and thence to CMYK color values to specify the pixels to be printed by the output device. In the art, such transformations have been defined on a mathematical basis using mathematical models for the input and output devices involved, or on an empirical basis based on empirical measurements of the input and output devices involved, or on some combination of both, as described in greater detail below.

Additionally, certain colors are not reproducible using combinations of red, green and blue. Thus, in order to represent these colors in RGB color space, it would be necessary to use negative coefficients. As an alternative, the Commission Internationale de l'Éclairage (CIE) has defined three standard color primaries, labeled X, Y and Z, to be used instead of red, green and blue. Using only positive coefficients, these primaries can then represent all colors visible to the human eye. Mathematical transformations of the X, Y and Z color coordinates have been used to form more nearly perceptually uniform color spaces. One nonlinear transformation which has yielded such a color space is the one defined in forming the 1976 CIE L*a*b* colorimetric system which is chosen for the present description. An alternative is the CIE L*u*v* colorimetric system.

Thus, when transforming colors from the input device color space to the output device color space, it is nearly always the case that certain input colors cannot be reproduced on the output device. Such colors are known as out-of-gamut colors and a method for their reproduction must be determined. In the art, methods of out-of-gamut color correction fall into two broad categories. In the first category, all colors are translated to new color representations regardless of whether a color is reproducible on the output device. This method is commonly known as gamut compression. In the second category, non-reproducible colors are redesignated while in-gamut colors are simply translated. This method is commonly known as gamut clipping. When either of these techniques are applied to input colors prior to storage in a frame buffer, the result is loss of the original color information.

The converse situation also holds true: there are colors which are included in the output device gamut, such as a color printer, that are not found in the input device gamut, such as a video monitor. Consequently, these colors will never be represented in the frame buffer when transforming colors from this input color space to the output device color space using these techniques.

In the early art, traditional color conversion techniques attempted to treat RGB and CMYK color spaces as linearized spaces requiring only trivial conversion algorithms to convert colors between them. These methods relied on idealized representations of RGB phosphors and CMYK inks that are highly inaccurate and are not realizable in actual practice. These conversions, when used in actual printing systems, do not produce output color representations which match the original specification of input color by an image generating device. Examples of these canonical conversion techniques are discussed, for example, in *Computer Graphics: Principles and Practice, Second Edition*; Foley and van Dam, et. al., c 1990 Addison-Wesley. While the Foley, van Dam, et. al. reference claims relevance of this technique for ink jet printer and xerographic devices, it has been proven in practice to provide insufficient quality color reproduction.

In the later art, more complex mathematical transformations such as Kubelka-Munk equations were used to model the non-uniformity of the RGB and CMYK color gamuts of actual input devices and output devices by more closely modelling the combination of subtractive colorants such as are used in a CMYK printer. These techniques proved intractable due to the nature of the high order equations used.

More recently, in the empirical method or the mixed mathematical model-empirical method, a convenient conversion technique involves using one of a number of different device-independent color spaces as an intermediate representation in a two-stage color conversion process. In the first stage of conversion, there is a transformation from the input device's color space to an intermediate color space. For example, it may be desirable to reproduce a set of standardized CMYK colors on a CMYK output device, such as a 4-color process printer. A spectrophotometer is used to measure the samples of the standardized CMYK color set and obtain device-independent color values. This correlation between device-independent color values and the standardized CMYK colors is used to map the input device's CMYK colors to coordinates in the intermediate color space. In the second stage of conversion, there is a transformation from the intermediate color space to the output device's color space. This transformation is performed using a listing of correspondences between coordinates in the intermediate color space and the output device colors. This listing also is obtained by reading output device color samples using a spectrophotometer. Typically, the intermediate color space is based on CIE L*a*b* or CIE L*u*v* colorimetric systems for reasons well-known and well-described in the art, including the important advantage that these intermediate color spaces can inclusively represent in a perceptually uniform manner all colors visible to the human eye, while others cannot. In practice, this method has most often been implemented as a color rendering dictionary in a Postscript® rendering system.

This two-stage process is used to transform input color specifications into device-dependent color specifications which then are stored in a frame buffer. That frame buffer stores device-dependent information, such as CMYK or RGB color values, in describing the output image pixel data which are used to form the output signals controlling the printing of that printer to thereby have the print engine therein correctly set the fractions of maximum toner or ink densities that it is to provide on the selected device.

In a computer graphics system that uses a color video monitor to specify and display colors, the color values of the generated image input sample data may be characterized in a chosen intermediate color space using a transform. The intermediate color space is provided for changing the color descriptions specified for the generated image input sample data from input color space (e.g., RGB, CMYK) to the intermediate color space and from the intermediate color space to the output device color space. For the case of an RGB input color sample data being translated to a CIE L*a*b* color space, the transformation from input color to the intermediate color space can be described mathematically. This transformation can be subdivided into three parts: a gamma correction phase, a linear tranformation to the CIE XYZ color space utilizing readings taken from the input device, and a standard non-linear transformation to the CIE L*a*b color space. The gamma correction phase and the linear transformation are well known in the art, and the CIE XYZ to CIE LAB transformation is well known in the art and is described, for example, in *Color Science: Concepts and Methods, Quantitative Data and Formulae: Second Edition*, Wyszecki and Stiles, c 1982 Wylie and Sons.

In completing this transform, the input device RGB color space to the intermediate color space, color printing systems have also compressed, during transformation of the specified output image sample data, the color gamut of the input device or of the generated input source image to a subset of that of the output device (the subset formed by the intersection of the input device gamut and the output device gamut), this latter gamut being known from a characterization of that output device into the intermediate color space as described below. Alternatively, color printing systems have shifted just those specified colors of pixels in the specified output image that are outside the output device color gamut during the transformation to being within that gamut, this usually being done by shifting the specified color to the nearest color that is within the gamut. Either method adds substantial calculation time to the transformation of the specified output image pixel data.

In the prior art, attempts have been made to solve problems posed by multiple input color spaces and the non-linearity of CMYK printing inks. These attempts have been based on storing additional data for each pixel in the frame buffer than would otherwise be required were the color representation sufficient of itself. The objective of these methods is to correct for inherent inaccuracies in the CMYK color model, such as proportionality failure and additivity failure of the inks. Additional information also may be stored at each frame buffer pixel location to designate out-of-gamut colors which may be referenced in an alternate external list. These techniques require additional memory, which results in increased manufacturing cost that ultimately must be passed on to the consumer. Furthermore, these systems require a computationally intensive post-processing phase to complete the transformation to the output device color values. Consequently, a single-store color representation that would efficiently represent multiple diverse color input spaces without requiring additional memory space or computational steps would be of great benefit.

Output devices such as color printers printing on a particular medium have also been characterized using intermediate color spaces by taking colorimetric or spectrophotometric measurements of printed color patches. Printed patches of known dot coverage fractions of cyan, magenta and yellow toners or inks, which may or may not use undercolor removal and gray component replacement steps, are typically measured with a spectrophotometer to provide the intermediate color space coordinates and thus provide the correspondence relationship between these coordinates and CMYK values used in printing the colors represented. Resulting correlations can be expanded to further colors through interpolation. Typically, some methodology must be applied to relate these coordinate sets to one another in some alternative way to avoid having to store too large a number of such correlations.

A listing of correlations must be provided for each device to be printed upon, as any change in output device will lead to a different appearance of the resulting printed image. Furthermore, a separate listing of correlations must be provided for each media of a specific output device for the same reason. Thus, a change in either the output device or output media for a given output device will necessitate a separate listing of correlations between input device and output device to ensure an accurate reproduction of the input image data. Such a correlation of listings must be provided for each kind of media to be printed upon as well, since any change in media will lead to a different appearance of the resulting printed image.

Thus, due to the device-dependence of the information rendered in the frame buffer, each change of output device or media will require a different transformation of the specified input image sample data from the input color space through the intermediate color space to the output color space. In addition, the new transformation requires the application computer program within the input image generating device to re-create the input image data which again must be raster image processed to create a new frame buffer with color information specific to the new output device or media.

Unfortunately, raster image processing can be of considerable duration, particularly for the printing of larger-sized graphical images containing large numbers of pixels. The requirement to raster image process the image input data for each new type of printer device and each new type of media results in a considerable loss of productivity in producing hardcopy output from more than one output device. Therefore, the ability to generate in a frame buffer pixel information which is not device-dependent would provide a significant benefit in enabling printing to multiple output devices.

SUMMARY OF THE INVENTION

The present invention provides processing of input color image data corresponding to an input image defined by an input image forming device which has the data color coordinates transformed to provide the basis for operating an output image forming device to form a corresponding output image, the transformation including an initial transforming of the input color image data color coordinates to coordinate values in a device independent intermediate color space. This transformation is completed using an output image forming device profile to allow performing same without need for determining output gamut fitting alteration of the intermediate values during such performance. The intermediate color space color coordinate values can be stored in an intermediate frame buffer to allow completion of the transformation at an alternative time.

DETAILED DESCRIPTION OF THE PREFERRED EMBODIMENTS

The present invention provides a printing system which permits choosing any of multiple output devices, such as color printers, of a kind for a printing job in which an output image is to be printed on selected medium, and permits selecting alternative media for such a printing job, all such selections being made without requiring further processing of pixel data or image input data by the system raster image processor. Selection of the kind of printer to be used is made at the time the textual and graphical input image is generated in composing the corresponding page description for printing which is accompanied by the subsequent raster imaging processing therefor, but the selection of the particular printer of the kind selected and selection of the media to be printed upon in that printer can be postponed until a convenient time is chosen for printing, or for making decisions concerning such a printing. Once a decision is then made to initiate the printing, no further raster processing steps need to be completed before beginning that printing job.

Figure 1:
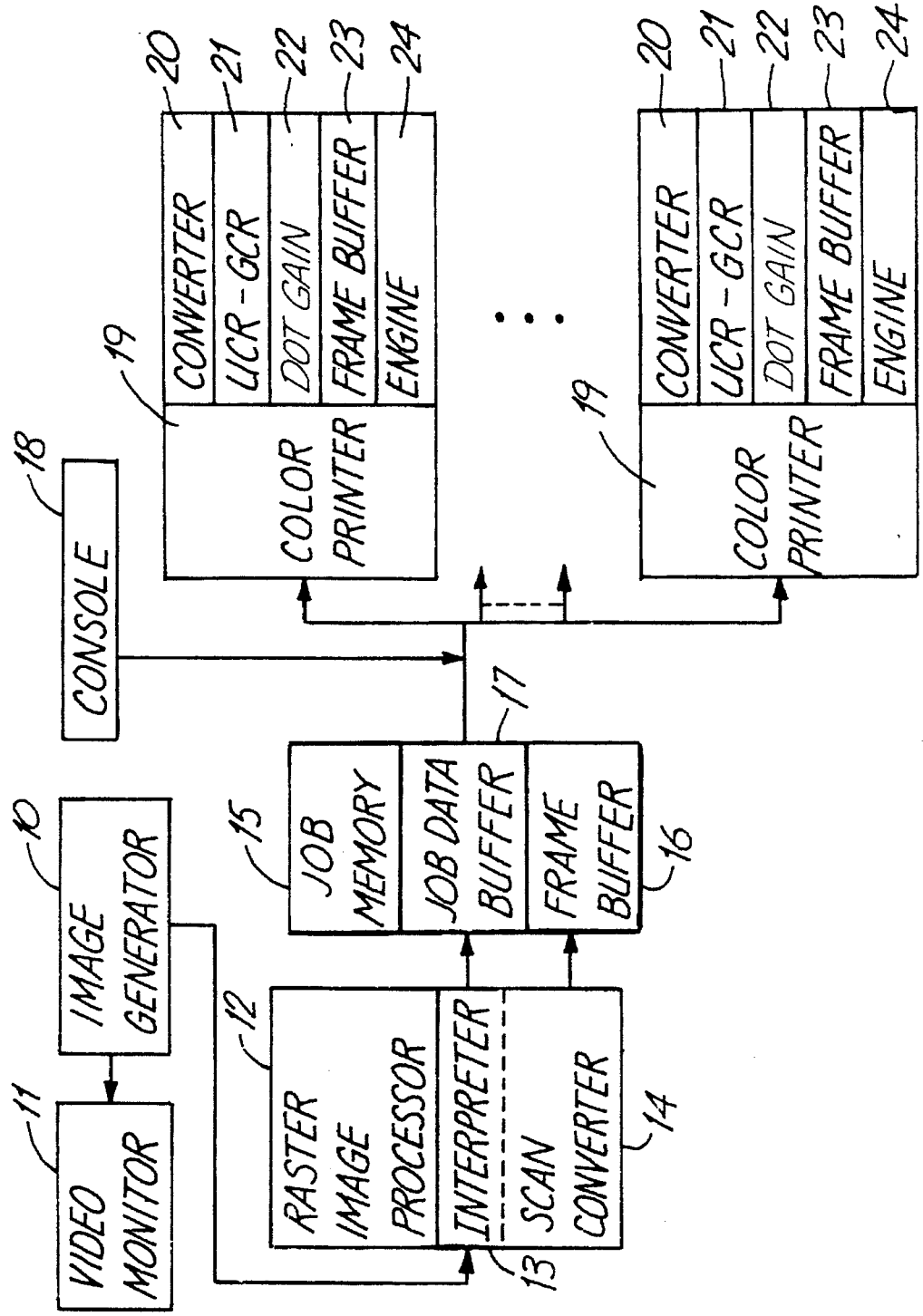
FIG. 1 shows a block diagram of a system embodying the present invention.
Figure 2:
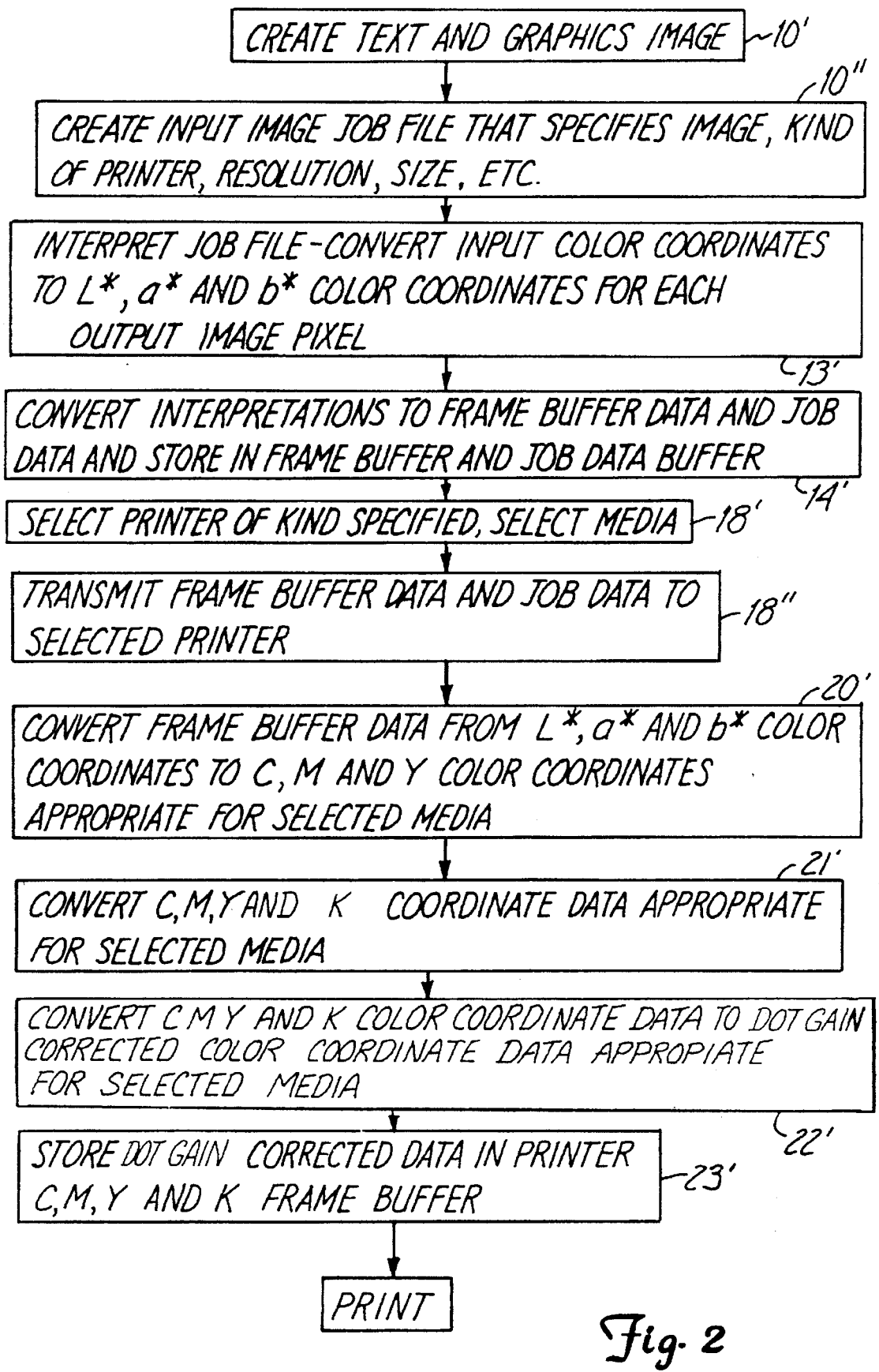
FIG. 2 shows a flow chart describing process flow in the system of FIG. 1.

A block diagram of a color printing system embodying the present invention is shown in FIG. 1. An image generator, 10, is shown on the left side of the diagram for generating the textual and graphical image elements to compose an input image and an output page description, this generator typically provided by any of several well known computer graphics systems. A textual and graphics image may be generated by using a paint, draw, desktop publishing, or other application computer program operating under the operating system used in the computer in the system. Alternatively, input image generator 10 may include an optical scanner capable of converting a previously printed or otherwise composed image into corresponding red, green and blue color-based electrical signals representing the scanned image. Such signals are converted to digitized signals to provide data which is then stored in the system graphics buffer memory or in files. That data may be subsequently imported by a graphics editing application computer program also operating under the operating system of the computer in the system. This process step is indicated in a flow chart box, 10', in FIG. 2.

Any of these applications programs, and the operating system for the computer in system 10, will together provide the necessary signals to operate a color video monitor, 11, shown in FIG. 1 which is capable of displaying a video page on which the input image is shown. Typically, video monitor 11 is operated to display the video page with the input image thereon under the control of signals supplied by system 10 including data signals for the image being generated describing input image video pixels by color coordinate values in the RGB color system.

In addition, any of these application computer programs or operating system printing utilities also generate a page description of the page being composed using a page description language provided therein as the basis for communicating to a color printer (or a gray scale printer or other output device) the contents of a specified output page corresponding to the video page as composed using the application-level graphical elements described therein. Commonly, the page description language used is the Postscript® page description language in either the Level 1 or Level 2 versions which provides device-independent page descriptions. The application-level graphic elements generated for display on video monitor 10 are translated to the page description language by the printer driver to produce a textual job file along with various items of information for the print job such as the name of the print job, the printing resolution chosen for the print job, the size of the image to be printed for the print job, the number of copies to be printed, the chosen number of pages, whether stochastic screening or half-tone printing methods are to be employed, and the like. However, the particular printer and the particular medium on which the print job is to be printed are not needed. This step is shown in another box, 10", in the flow chart of FIG. 2.

Once the commands are formed in the textual job file, they are thence transmitted to a raster image processor, 12, which interprets the commands in the job file in an interpreter, 13, shown in FIG. 1. This interpretation activity includes the conversion of the specified input image sample data from a description therefor based on color coordinates used by system 10, typically coordinates in the RGB or CMYK color system, to that color coordinate description to be used in forming the output device bitmaps to be stored in a memory, one for each such coordinate, that are to contain the data defining each pixel that is to appear in the output image. That is, each such bitmap is to be formed in a corresponding portion of a memory and, for each pixel specified to appear in the output printed image, store, at a corresponding storage cell location in the bitmap pattern in each memory portion, the associated color coordinate value for that pixel. This interpretation activity is indicated in a further box, 13', in the flow chart of FIG. 2.

In two-stage color conversion systems as described previously, the transformation of the specified input image sample data, such as that described in the RGB color space, was to an intermediate description in intermediate color space coordinates thence to a final description in CMYK color values so that the device-dependent color values for each pixel are stored as bitmaps in a CMYK frame buffer memory in the output color printer. In the system of FIG. 1, however, rather than performing a complete transformation followed by storage of device-dependent color values in the output printer frame buffer, the specified input image sample data, as described in the intermediate color space coordinate values, is stored in an intermediate frame buffer memory. This arrangement allows the pixel color coordinate data to be stored in a device-independent form so that it may be used to specify original color values to any of the kind of color output printers as may be ultimately selected by an operator without having to be again raster image processed by raster image processor 12. Thus, the original input image sample data is preserved and transformed from a description based on RGB or CMYK color space to one based on the intermediate color space. Here, the CIE L* a* b* color space model has been chosen but other device-independent color space choices are possible.

This transformation of input image sample data is accomplished using the 3-stage transformation technique described above in which the specified input image sample data described in RGB color system coordinates is transformed to CIE L*a*b* color space. In the accomplishment of this transformation, a scan converter, 14, enters data for each pixel in an intermediate job memory, 15. Scan converter 14 provides the L*a*b* color space coordinates for each input image data sample at corresponding locations for that pixel in three bit map portions of job memory 15 each corresponding to one of those color coordinates, these three portions forming an intermediate color space frame buffer, 16, in job memory 15. The job data for the particular printing job is also passed along by interpreter 13 and stored in a job data buffer, 17, in job memory 15. This conversion of the interpretations of the page description commands to stored data is indicated in a further box, 14', in the flow chart of FIG. 2.

The transformation of the specified input image sample data description based on the RGB color space to L*a*b* color space coordinates is done rounding off of any fractional parts of the resulting coordinate values for the chromatic coordinates a* and b* so that only whole numbers, or integer values, are provided for these coordinates for any pixel. These integer values are represented by eight bit binary numbers, and so can represent 256 different values for each of the chromatic coordinates for each pixel, these chromatic coordinates each extending from −128 to +127 in the L*a*b* color space.

The luminance coordinate L* has positive values only and extends from 0 to 100 in the L*a*b* color space. Thus, only seven bit binary numbers would need to be used if all fractional parts of this coordinate resulting from that transformation were rounded off to integer values for each pixel. However, human observers are more sensitive to luminance changes than they are to chromatic changes. As a result, an eight bit binary number is also used to specify luminance values but with the least significant bit being a fractional bit that in effect appears in the first digit position to the right of the binary point. That is, fractional parts of the value for the L* coordinate of a pixel are rounded to the nearest half unit value thus allowing specifying half unit increments along the luminance axis. Thus, the color coordinates of the pixel data for the pixels of the specified output image are valued by binary numbers of eight bits each for a total 24 bits being provided for each such pixel.

In this representational system, as will be understood by those skilled in the art, the method of the present invention can represent multiple input color spaces and faithfully preserve the original input color specifications without requiring a secondary memory store or a secondary gamut-mapping post-processing phase. This faithful color representation enables the data stored in the frame buffer 16 to be output to any output device, regardless of type or quantity of the output device's native colorants.

Although the job file from system 10 has been described as providing commands resulting in input image sample data based on the RGB color space, the Postscript® page description language can also provide input image sample data in the CMYK color space, or in other color spaces, such as CMYK and CIE. If the textual job file prepared for raster image processor 12 specifies input image sample data in the CMYK color space, the desired outcome of printing will match an industry standard process color system, such as the TruMatch Swatching System. Since the characterization of the output color printer, to be further described below, provides a correlation table between the L*a*b* color space coordinates and the CMY color space coordinates, a look-up table is referenced in interpreter 13 in raster image processor 12 incorporating this correlation table. A job file that specifies the color coordinate pixel data description in a CIE color space other than the L*a*b* color space can be transformed to this latter color space using a well known mathematical transformation which is embedded in interpreter 13 of raster image processor 12. These techniques extend to any type of input specification that can be either directly converted or converted via a device-characterization process as described above.

Scan converter 14 constructing the specified output image pixel data in frame buffer 16 results in that data being stored in a random access semiconductor memory. The data passed to job data buffer 17 will also be stored in a random access semiconductor memory. In this kind of memory, the job data and the pixel data described in L*a*b* color coordinates could be rapidly communicated to an output color printer at any time printing of the output image is desired. However, job memory 15 can also have therein a magnetic hard disk memory for longer term storage of the output image pixel data in frame buffer 16 and the job data in job data buffer 17. This is particularly useful if other page descriptions are to be composed and raster image processed before an earlier generated and processed image is to be printed, since frame buffer 16 and job data buffer 17 would then be available for these later print jobs. If several such print jobs are expected to be stored for longer term, the data from frame buffer 16 can be compressed using well known compression algorithms before being stored on the hard disk to thereby conserve memory space on that disk. A job stored on the hard disk must first be decompressed (if compression has been used) and re-entered in frame buffer 16 and job data buffer 17 before transmission of that information to an output color printer, assuming there exists no other connection between the hard disk and the output device color printers such as a job routing device. A further alternative, not described herein, would be to have a magnetic hard disk associated with one or more of the output device color printers to receive the data from frame buffer 16 and job data buffer 17 for storage at the printer before its is used to control that printer in its providing of a corresponding output printed image.

Although FIG. 1 shows system 10, raster image processor 12 and job memory 15 as separate entities, all could be combined in system 10. Alternatively, raster image processor 12 and job memory 15 could be separately combined as an color printer controller under the direction of system 10. The housing of the system components in various possible combinations is immaterial.

As indicated above, the output device color gamut must be characterized to establish the correspondency of printed colors to the intermediate L*a*b* color space. This will ensure that the specified output image pixel data stored in frame buffer 16 and based on the device-independent color coordinates will be properly transformed to the color values native to the output device. For example, these output devices would include 4-color process printers, 8-color process printers, monochromatic printers, RGB printers, contone CMYK printers, and so forth. Proper transformation of output image pixel data to output device color values will ensure that the colors printed in the hardcopy output image will match sufficiently well to those that appeared on video monitor 11 during the generation of the input image sample data in system 10 during composition of the video page representation ultimately to be rendered and printed. This characterization is accomplished based, as described above, on directing the output color printer being characterized to print color patches each of a different color on a selected medium. The patches printed are to be such that there is one printed patch of each color in all colors resulting from printing every combination of each 10% density increment of each of the cyan, magenta and yellow toners or inks (11 per ink color). That is, the 0%, 10%, 20%, and so forth, fractions of the maximum printing densities of each of these inks are used to form all possible printed patches each printed with a different combination of these printing ink densities from each color.

Separate printed patches for each toner or ink are used for determining dot gain values for that toner or ink. These values are assembled into a dot gain table and the patches are printed using the dot gain tables, an undercolor removal step, and a gray component replacement step. This is typically done by removing from each color of toner or ink in the patch a maximum density fraction equal to the smallest toner or ink maximum density fraction present among the three inks forming the patch color; and using a replacement step, typically done by replacing the removed fractions with black ink in a maximum density fraction equal to that used in the removals. These patches are then measured with a spectrophotometer to provide for each patch L*a*b* color space coordinate values. Using interpolation, a much greater number of effective patch colors is generated with corresponding L*a*b* color space coordinate values and CMY color space coordinate values.

Even with such interpolation, however, the number of spatial locations in the L*a*b* color space having integer values for its chromatic coordinates and either integer or integer plus half unit values for its luminance coordinate (hereinafter "permitted spatial locations") will greatly exceed the number of coordinate locations in that space associated with an effective or measured patch color and so with the corresponding C, M and Y coordinates for that color. Because of the much greater rate achievable for the processing of images in raster image processor 12 if that processor need not compress or shift the colors of pixels in the specified output image in the job file from system 10 which are outside the output color printer reproducible color gamut to being within that gamut, there is a substantial benefit in arranging for each permitted spatial location in the L*a*b* color space to effectively have a corresponding CMY color space location to which it is transformed either directly or by interpolation.

In order to provide such an arrangement, each permitted spatial location in the L*a*b* color space that is within the output device color printer reproducible color gamut is arranged to transform to that set of CMY coordinates paired by an effective or measured color patch to that permitted spatial location that is closer to the location being transformed than any other similarly paired permitted spatial location. Similarly, each permitted spatial location in the L*a*b* color space which is outside of the output device color printer reproducible color gamut is arranged to transform to that set of CMY coordinates associated with that effective or measured color patch at the edge of this gamut having the closest color to that specified by the location being transformed. Such transforms result, in effect, in the reproducible color gamut of the output color printer being made congruent with the L*a*b* color space in that there is no color specified in that space that the printer won't attempt to print.

A listing, however, of all such individual transforms from permitted spatial locations in the L*a*b* color space would require a large amount of storage space. In this circumstance, eliminating most of the effective and measured color patches and the transforms linked thereto is necessary to reduce such a listing to a manageable size. Yet, retaining a well-distributed sampling of such patches over the reproducible color gamut of the output color printer, including all at the outer surface of that gamut, and the transforms of the permitted spatial locations in the L*a*b* color space associated therewith, will provide a suitably accurate transformation arrangement when coupled with the use of appropriate interpolation for those permitted spatial locations which no longer have a listed transform. Thus, this transformation arrangement will permit fast and accurate transformations of pixel data based on L*a*b* color space coordinates in frame buffer 16 to pixel data based on CMY color space coordinates while eliminating any need to perform out-of-gamut color corrections during such transformations. The listing of transforms of the permitted spatial locations in the L*a*b* color space, associated with the retained patches, to the CMY coordinates values for those patches comprises the profile of the output device color printer using the medium on which the measured patches were printed.

Such a characterization of the output color printer must be done for each kind of media to be used in having output images printed thereon by that color printer. The profiles resulting from these characterizations of the printer for each medium to be used therewith are stored in the control system provided in that printer for forming, among other uses, a converter to be used in converting the device-independent data contained in frame buffer 16 to a form suitable for use by the print engine of that particular output device color printer. Additional characterization profiles of either new output devices or new media for current output devices may be added to the system at a later date.

Each output color printer which can receive data from frame buffer 16 must have been similarly characterized and have similar profiles therefor stored within. Thus, an operator running a console, 18, as shown in FIG. 1, in deciding to send a print job which has already been raster image processed and stored in frame buffer 16, may selectively choose at a convenient time which of the output device color printers, 19, that are in operable communication with frame buffer 16 for receiving job files, is to receive a job or jobs for printing and also may selectively choose which medium the job or jobs will be printed on without being required to retransmit the original job file for raster image processing for each specific selectable output device and each specific selectable media. Entering those decisions into console 18, indicated in another box, 18', in the flow chart of FIG. 2, thus selects which of the available output device color printers 19 in FIG. 1 of the kind chosen for the job is to be used, and also selects which of the media possible to use in the selected one of a plurality of output devices is to be the media upon which the image is printed.

Console 18 may be replicated with each combined with one of printers 19 as part of the operator control panel therein or, alternatively, may be combined with a color controller containing frame buffer 16. In a further alternative embodiment, the console may be eliminated, with operator choices made available by the application-level user interface of the graphical computer program used in system 10 which are thereafter transmitted to the color controller and printers. Another possibility is to have raster image processor 12 and frame buffer 16 combined with console 18 and with a color printer 19 in a single unit. Other alternatives are also possible.

A converter, 20, in each color printer 19, or alternatively in device 12, has a profile stored therein for each kind of media which can be used in printing with that printer. The commands from console 18 specify for the printer chosen which of the profiles are to be used in transforming output image pixel data stored in frame buffer 16 to output device color values. A start command entered on console 18 begins the transfer of specified output image pixel data from frame buffer 16 to converter 20 in the chosen output device color printer 19 as indicated in a further box, 18A, in the flow chart of FIG. 2. A processor in color printer 19, or alternately device 12, operates in part as converter 20 to transform the specified output image pixel data from frame buffer 16 based on L*a*b* color coordinates to pixel data based on CMY color coordinates with coordinate values appropriate for the profile chosen by the operator at console 18 as indicated in a succeeding box, 20', in the flow chart of FIG. 2, and ultimately to CMYK color values for that printer.

After this transformation, undercolor removal and gray component replacement steps are performed as described above. Not all output devices require the use of UCR, GCR and dot gain techniques. Output devices which do not require these techniques include RGB monitors. The processor in color printer 19, or alternately device 12, performs these techniques by operating in part as a UCR-GCR converter 21, shown in FIG. 1, which in effect transforms the specified output image pixel data from converter 20 based on CMY color coordinates to pixel data based on CMYK color coordinates as indicated in a box in the flow chart of FIG. 2 designated 21'. This UCR-GCR transformation may be altered from what was described above using the CMYK recorded information obtained for the patches measured by the spectrophotometer during the characterization of the output device color printer for a specific media to provide further adjustments in this correction process.

Thereafter, the specified output image pixel data now comprises CMYK color values appropriate for each of those values dot gain as corrected using a dot gain table 22, shown in FIG. 1 and implemented by having the processor in printer 19, or alternately in device 12, operate in part as this corrector. This dot gain adjustment alters the ink coverage so as to provide the proper color appearance of the printed ink to compensate for the problems of ink proportionality and additivity failure, dot gain in the medium printed upon, and so forth. This step is indicated in the flow chart of FIG. 2 in a following box, 22'.

The specified output image pixel data now comprising CMYK color values after this dot gain correction is then stored in a printer frame buffer, 23, in printer 19, or alternately in device 12, where it is ready for use in directing a print engine, 24, in that printer during the subsequent printing of the corresponding output image. Such storage in a memory containing printer frame buffer 23 is indicated in the flow chart of FIG. 2 in an additional box, 23'.

In a printer capable of rapid printing, such as a color laser copier, printer frame buffer 23 will have to store in memory all the specified output image pixel color values therein to permit a rapid transfer thereof to print engine 24 during printing. Such color values for each pixel is stored in a corresponding location in each of four portions of that memory, each memory portion being associated with a corresponding one of the C, M, Y and K color planes. The values of these coordinates are kept as eight bit binary numbers for each coordinate in such a continuous tone printer so that there are 32 bits of color information maintained for each pixel in this printer frame buffer. In slower operating printers, less buffer memory need be used if the data transfer rate from intermediate frame buffer 16 to the selected printer 19 is sufficient to provide the print engine with imaging data at the rate required. While the foregoing description has been directed to continuous tone printers, the invention can also be used with binary tone printers that rely on dithering, half-toning or stochastic screening in providing output colored images. In that circumstance, the output image pixel data in frame buffer 16 will correspondingly be reduced and the profiles in converters 20 will correspond to the kind of output device used. Conversely, more memory will be needed by output devices which use greater pixel depth or have more color planes.

The data stored in frame buffer 16 may be provided to a variety of output devices. This avoids many problems such as image processing errors, color consistency errors, and so forth, which are introduced by repeated raster image processing of the same Postscript® job file. This capability provides an advantage for production systems where, for example, it is necessary to produce hardcopy proofs and final output film. This capability is met by the present invention.

Although the present invention has been described with reference to preferred embodiments, workers skilled in the art will recognize that changes may be made in form and detail without departing from the spirit and scope of the invention.

What is claimed is:

1. A method of processing input color image data corresponding to an input image as specified by an input image forming device to be used in directing selected output image forming devices to form a corresponding output image, said method comprising:

generating in said input image forming device said input color image data having a portion corresponding to a specified output image based on said input image and a further portion corresponding to characteristics selected from those available in said output image forming devices;

storing that portion of said input color image data corresponding to characteristics selected from those available in said output image forming devices in a job memory;

converting in a processor that portion of said input color image data corresponding to said specified output image into values for up to three color coordinates of a selected intermediate color space for each pixel in said specified output image as determined from said selected characteristics; and storing said intermediate color space color coordinate values for each pixel in said specified output image in portions allocated for that coordinate in an intermediate frame buffer memory, said intermediate color space color coordinate values differing from those color control values required for specifying colors to be provided by a said output image forming device having said selected characteristics in forming said corresponding output image, said job and intermediate frame buffer memories containing data insufficient to specify that one of alternative available conversion processes for converting said intermediate color space color coordinate values to said color control values which would result in a said output image forming device having said selected characteristics providing that one of those corresponding output images available therefrom that is colored to appear most like that of said specified input image.

2. The method of claim 1 further comprising entering in said processor from an external source other than said input image forming device that additional data necessary to specify which of said conversion processes is to be used in said output image forming device.

3. The method of claim 1 further comprising entering in said output image forming device from an external source other than said input image forming device that additional data necessary to specify which of said conversion processes is to be used in said output image forming device.

4. The method of claim 1 further comprising receiving in said output image forming device said intermediate color space color coordinate values and subjecting them to a selected one of said conversion processes specified by additional data, obtained from an external source other than said input image forming device, to form said color control values which are also color coordinate values in an output color space having at least one more color coordinate than does said intermediate color space.

5. The method of claim 1 wherein there are a plurality of said output image forming devices having said selected characteristics, and said input color image data further contains an indication of a selected one of that said plurality that is also stored in said job memory in said processor, said plurality of said output image forming devices having said selected characteristics each being capable of receiving said intermediate color space color coordinate values if selected to receive same by said indication in said input color image data.

6. The method of claim 1 wherein said processor and said input image forming device are a common device.

7. The method of claim 1 wherein said job and said intermediate frame buffer memories are provided in a common memory.

8. The method of claim 1 wherein said characteristics selected from those available in said output image forming devices include selected output image size and selected output image printing resolution.

9. The method of claim 4 further comprising storing said color control values as coordinates in said output color space for each said pixel in portions allocated for that coordinate of an output frame buffer memory in said output image forming device.

10. The method of claim 8 wherein said characteristics selected from those available in said output image forming devices further include selected output image forming device kind.

11. A method of processing input color image data corresponding to an input image as specified by an input image forming device to be used in directing selected output image forming devices to form a corresponding output image, said method comprising:

generating conversion processes profiles for each said printing medium to be available for printing upon in each of said selected output image forming devices and storing each in a corresponding profile memory, a said conversion process profile for a said output image forming device being formed by a set of transforms of selected color coordinate values in a selected intermediate color space to color control values required for specifying colors to be provided by that said output image forming device in forming a said output image, a conversion process converting said intermediate color space color coordinate values to said color control values using, for such conversions, that said conversion process profile corresponding thereto for said selected locations in said intermediate color space and, for other locations in an intermediate color space, using interpolation and that said conversion process profile corresponding thereto;

generating in said input image forming device said input color image data corresponding to a specified output image based on said input image;

converting in a processor said input color image data into values for color coordinates in said intermediate color space for each pixel in said specified output image; and converting, in a selected one of said processor and that said output image forming device used for forming said output image, said intermediate color space color coordinate values for each pixel in said specified output image to those color control values required for specifying colors to be provided by a said output image forming device in forming said corresponding output image by using that said conversion process having a corresponding conversion process profile which corresponds to said output image forming device selected to form said output image on a selected said medium.

12. The method of claim 11 wherein said converting in said processor is followed by storing said values for color coordinates in said intermediate color space for each pixel in said specified output image in an intermediate frame buffer memory in said output image forming device.

13. The method of claim 12 wherein said converting in a selected one of said processor and said output image forming device is followed by storing said color control values for each pixel in said specified output image in a output image forming device frame buffer memory in said output image forming device.

* * * * *

UNITED STATES PATENT AND TRADEMARK OFFICE
CERTIFICATE OF CORRECTION

PATENT NO. : 5,572,632
DATED : NOVEMBER 5, 1996
INVENTOR(S) : ROBERT A. LAUMEYER, CHRISTOPHER J. LAUREL

It is certified that error appears in the above-indentified patent and that said Letters Patent is hereby corrected as shown below:

Col. 2, line 6, delete "priming", insert --printing--

Col. 12, line 36, delete "18Δ", insert --18"--

Signed and Sealed this

Twenty-fifth Day of March, 1997

BRUCE LEHMAN

*Attest:*

*Attesting Officer*     Commissioner of Patents and Trademarks